United States Patent [19]
Clark

[11] 3,826,281
[45] July 30, 1974

[54] THROTTLING BALL VALVE
[75] Inventor: Edward C. Clark, Cheverly, Md.
[73] Assignee: The United States of America as represented by the Secretary of the Navy, Washington, D.C.
[22] Filed: Oct. 29, 1969
[21] Appl. No.: 872,265

[52] U.S. Cl............. 137/625.31, 251/127, 251/315, 251/118
[51] Int. Cl. .................................................. E03b
[58] Field of Search..................... 137/625.31, 625.3; 251/127, 315, 118

[56] References Cited
UNITED STATES PATENTS
2,517,061  8/1950  Stackelberg .................. 251/127 X
2,908,290  10/1959  Hamilton-Peters et al. ......... 251/118
3,023,783  3/1962  Vickery ......................... 251/315 X
3,041,036  6/1962  McFarland, Jr. ................. 251/315 X FOREIGN PATENTS OR APPLICATIONS
2,305  0/1879  Great Britain ................... 137/625.3

*Primary Examiner*—Samuel Feinberg
*Attorney, Agent, or Firm*—R. S. Sciascia; Q. E. Hodges

[57] ABSTRACT

A ball valve having a ball with a porous core which acts as a filter and a noise reduction element, allowing use of the valve as a throttling valve as well as a shut-off valve.

4 Claims, 1 Drawing Figure

PATENTED JUL 30 1974      3,826,281
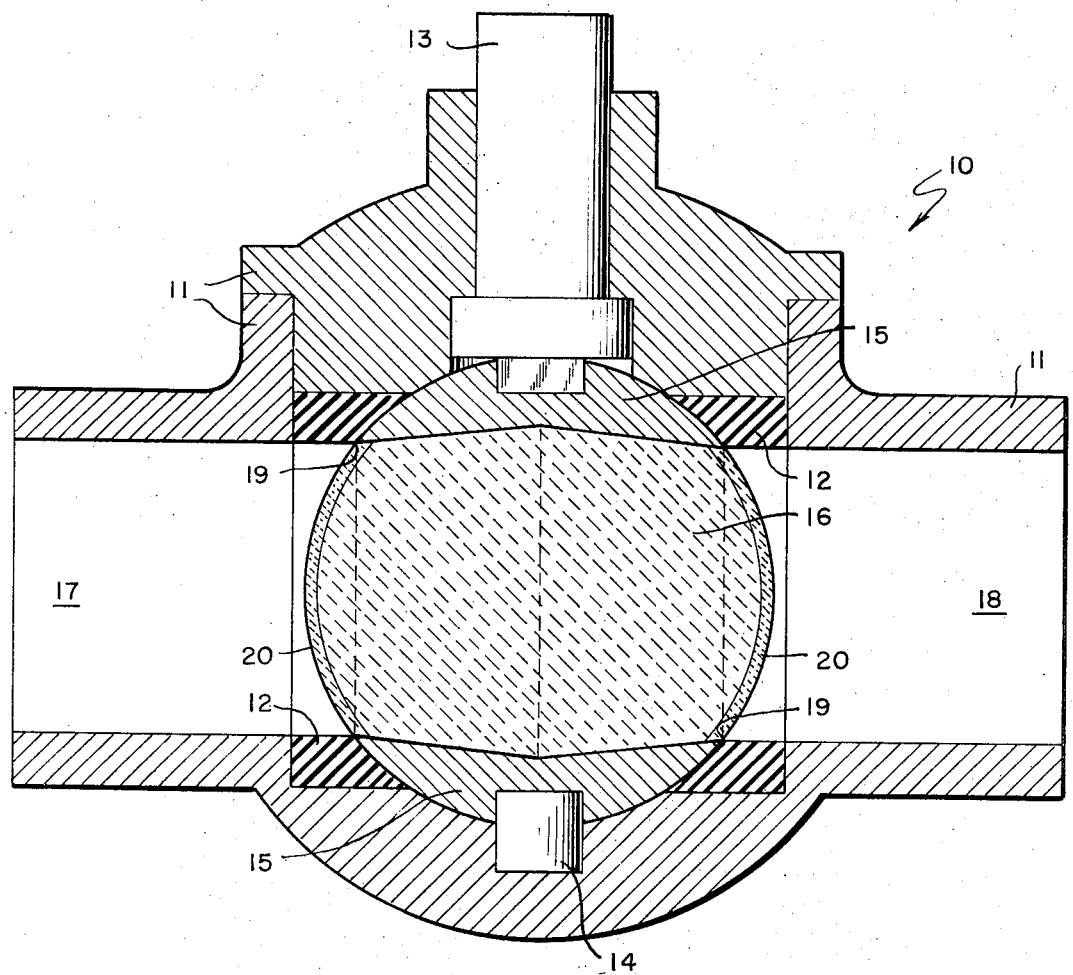
INVENTOR.
EDWARD C. CLARK
BY
ATTORNEYS

THROTTLING BALL VALVE

The invention described herein may be manufactured and used by or for the Government of the United States of America for governmental purposes without the payment of any royalties thereon or therefor.

BACKGROUND OF THE INVENTION

This invention relates to a ball valve which exhibits low noise and filtering characteristics and, more particularly, to a new valve with an improved ball structure including a porous portion for controlling the flow of material in a fluid handling system.

In the design and manufacture of ball valves, there are many problems which, in the past, have been difficult to overcome. In the conventional ball valve it is necessary for the ball to have an accurate geometric shape and to have a smooth finish. These requirements are made necessary because the ball must engage the seats or seals so that there will be no leakage in the shut-off position. The sealing requirements, therefore, dictate that the ball shape and finish be accurate with the result, of course, that the expense involved is often prohibitive. If these requirements are not met, the ball will eventually destroy the seals and leakage will occur. Similar problems related to seal or seat destruction have occurred when attempting to use conventional ball valves for throttling or in a partly open position for extended periods of time. In other words, these valves have short operating lives when used in anything other than fully open or closed positions. The limited life of these valves in the partly open position has made them impractical for use as automatic or manual controlled throttling valves. Typically, these valves display the characteristics of high break away and high operating torque which may give rise to still other problems.

Conventional ball valves are designed to include such features as partly or completely floating seats and ball, spring loaded seats or ball mounted on trunnion assemblies. Such design features represent attempts to assure tight closure based on the check valve effect where the ball tends to seat against the non-metallic seat as long as there is a pressure differential across the valve. Even where the ball has an accurate geometric shape and a smooth finish, there is a tendency for the lip of the passage-way through the ball to cut the non-metallic seat, thereby destroying the tight shut-off capability of the seat.

There are, therefore, outstanding requirements for ball valves which are reliable and achieve tight shut-off over a long period of time, which can be used as throttling valves, display characteristics of low break away and low operating torque, while at the same time are inexpensive to produce. Such requirements have proved difficult to achieve in the past, however, the present invention does teach an apparatus capable of meeting these requirements.

Accordingly, it is an object of the present invention to provide a new and improved ball valve.

Another object is to provide an improved ball valve having improved reliability characteristics.

A further object is to provide a ball valve which can achieve a tight shut-off characteristic over a long period.

Still another object is to provide a ball valve which can be used as a throttling valve.

A still further object is to provide a ball valve with low break away and low operating torque.

A further object is to provide a ball valve in which the completed sphere of the ball is in contact with the entire seat of the valve at all times thus preventing "nipping" of the seat ring of the valve.

SUMMARY OF THE INVENTION

The present invention accomplishes the above cited objects by providing a ball valve with a porous core in the ball.

More specifically, there is provided a suitable, well-known ball valve consisting of a body, non-metallic seat, stem and ball. However, while the prior art balls have hollow cores, the core in the ball relating to the present invention is filled with a porous material. The porous material, for example, may be a sintered metal.

Sintered metal has many of the properties of regular metal but additionally may be made porous, the degree of which can be accurately controlled. Additionally, many conventional alloys are suitable materials for sintering.

Though not a critical feature, the center portion of the core may be enlarged so that the sintered metal can be molded into the metal in such a fashion that metal is effectively locked in place. Enlarging the center portion of the core also has the advantage of reducing the pressure drop through the valve.

The part of the sintered metal in the core that becomes an extension of the surface of the ball may be made with characteristics that provide for a smooth, hard finish that is suitable for a good bearing surface. This type of structure will present no sharp or rough lip and, therefore, would virtually eliminate the problem of seat destruction. The sintered metal in the interior portion of the core would ordinarily be made with a rough, open characteristic that would present a minimum pressure drop to the fluid in the line.

A conventional stop for the valve may be employed to prevent rotation of the ball more than 90°. On the other hand, since the sintered metal core of the ball will tend to act as a filter, it may be an advantage not to employ a stop, but rather to allow 180° rotation which will permit the "filter" to be back washed. It is also noted that this type of core construction also produces a reduced noise characteristic, particularly when used as a throttling valve to produce a large pressure drop.

BRIEF DESCRIPTION OF THE DRAWING

The sole FIGURE is a sectional view of a ball valve illustrating an embodiment of the invention.

DESCRIPTION OF THE PREFERRED EMBODIMENT

Referring now to the FIGURE, there is shown a sectional view of the porous core ball valve 10 constructed according to the teachings of this invention.

As previously stated, the ball valve 10 of this invention is similar in some respects to conventional ball valves and has a body 11, a seat 12, a stem or upper trunnion 13, a lower trunnion 14, and a ball 15 with a core 16. The body 11, of course, is made rigid and forms a fluid flow channel. The seat 12 is made of any suitable material so that it forms a tight seal when the ball 15 presses against it when there is a differential pressure between channel region 17 and channel region 18. Upper trunnion 13 may have a handle or control linkage (not shown) connected to it in order to drive the ball 15. The lower trunnion 14 serves merely as a pivot for the ball.

In conventional ball valves, the ball ordinarily will have a cylindrical core which is left hollow. This type structure, as stated above, would leave a sharp edge which will eventually damage the seat 12 about its peripheral edges 19. The present invention employs a ball whose core is not exactly a cylinder but rather one whose core 16 is enlarged at the center of the ball and gradually tapers down while approaching the periphery of the ball. The core is filled with a porous material, preferably a sintered metal which is machined at the surface of the ball as a smooth extension of sphere. The geometric configuration of the core assures that the porous material is locked in.

In practice, the core 16 can be designed with desired gradients of porosity. One configuration, as indicated in the figure, employs a closely knit formation in order to achieve a smooth finish where the material forms an extension of the spherical surface of the ball. A relatively open formation is used for the internal portion of the core material so that the material there presents itself as a highly porous material that presents little resistence to fluid flow and therefore, little pressure drop. A porous material in the core 16, such as a sintered metal, also acts as a filter to solid particles carried in the fluid flow. The "filter" could be back washed simply by providing for 180° rotation of the ball 15.

What has been disclosed is a porous core ball valve with many improved characteristics relating to broadened use as a throttling valve, longer life times, greater reliability, filtering capacity and low noise. It should be understood, of course, that the foregoing disclosure relates only to a preferred embodiment of the invention and that numerous modifications may be made therein.

What I claim is:

1. A ball valve comprising:
    a valve body having an upstream end face, a downstream face, and a bore extending therethrough intersecting said end faces;
    a valve ball moveably positioned in said bore, said valve ball having a porous core therethrough forming an extension of the spherical contour of said valve ball whereby said valve ball is essentially a complete sphere and being rotatable between an open position wherein said core and said bore are aligned and a closed position wherein said bore and said core are disaligned;
    control means operably connected to said valve ball for rotating said valve ball between said open and closed positions; and
    seal means disposed in said bore and engaging said valve ball in a substantially fluid tight fashion.

2. The ball valve of claim 1 wherein said porous core has a larger cross-sectional area within said valve ball than at its surface.

3. The ball valve of claim 1 wherein said porous core is a sintered metal.

4. The ball valve of claim 3 wherein said sintered metal extends to and forms an essentially smooth finish at the surface of said valve ball and is relatively larger in cross-sectional area and more porous at the interior of said valve ball than at its surface, said surface being in essence, a complete sphere.

* * * * *

UNITED STATES PATENT OFFICE
CERTIFICATE OF CORRECTION

Patent No. 3,826,281                    Dated July 30, 1974

Inventor(s)  Edward C. Clark

It is certified that error appears in the above-identified patent and that said Letters Patent are hereby corrected as shown below:

On the title page, <u>delete</u> all reference to an assignee; as follows:

"[73] Assignee:  The United States of America
                 as represented by the
                 Secretary of the Navy,
                 Washington, D.C."

Signed and sealed this 5th day of November 1974.

(SEAL)
Attest:

McCOY M. GIBSON JR.                    C. MARSHALL DANN
Attesting Officer                      Commissioner of Patents